(12) United States Patent
Daye et al.

(10) Patent No.: US 8,139,734 B2
(45) Date of Patent: Mar. 20, 2012

(54) CALL VOLUME BASED IVR CALL DURATION AND PORT ADJUSTMENT

(75) Inventors: Sheri G. Daye, Boca Raton, FL (US);
Peeyush Jaiswal, Boca Raton, FL (US);
Naveen Narayan, Flower Mound, TX (US); Fang Wang, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 1212 days.

(21) Appl. No.: 11/860,095

(22) Filed: Sep. 24, 2007

(65) Prior Publication Data

US 2009/0080639 A1    Mar. 26, 2009

(51) Int. Cl.
*H04M 15/00* (2006.01)
*H04M 7/00* (2006.01)
*H04M 3/00* (2006.01)

(52) U.S. Cl. .......... 379/112.03; 379/221.03; 379/266.04
(58) Field of Classification Search ............. 379/112.01, 379/112.04, 112.05, 112.06, 112.1, 88.18, 379/221.03, 266.01, 266.04
See application file for complete search history.

(56) References Cited

U.S. PATENT DOCUMENTS

| | | | |
|---|---|---|---|
| 6,366,879 B1 * | 4/2002 | Coxhead et al. | 704/201 |
| 2003/0114166 A1 * | 6/2003 | Franz et al. | 455/453 |
| 2004/0001577 A1 * | 1/2004 | Yang et al. | 379/112.01 |
| 2006/0104307 A1 * | 5/2006 | Jones et al. | 370/468 |
| 2008/0205611 A1 * | 8/2008 | Jordan et al. | 379/112.04 |

* cited by examiner

*Primary Examiner* — Quoc D Tran
(74) *Attorney, Agent, or Firm* — Yudell Isidore Ng Russell PLLC (57) ABSTRACT

A method, system and computer-readable medium are disclosed for adjusting port usage and call duration in an interactive voice response (IVR) system based on changes in call volume. In one embodiment, the method comprises monitoring usage of one or more ports within an IVR system. A determination is made whether the usage of the ports exceeds a predetermined threshold for port usage. In response to determining port usage exceeds the predetermined threshold, the method adjusts one or more call flows within the IVR system to reduce call duration within the IVR system.

17 Claims, 6 Drawing Sheets

CALL VOLUME BASED IVR CALL DURATION AND PORT ADJUSTMENT

BACKGROUND OF THE INVENTION

1. Field of the Invention

The present invention relates in general to the field of interactive voice response systems.

2. Description of the Related Art

In telephony, interactive voice response, or IVR, is a technology that allows a computer to detect voice and touch tones using a normal phone call. An IVR system can respond with pre-recorded or dynamically generated audio to further direct callers how to proceed. IVR systems can be used to control almost any function where the interface with a caller can be broken down into a series of simple menu choices. Once constructed, IVR systems generally scale well to handle large call volumes.

IVR systems are typically used to service high call volumes, reduce cost and improve the customer experience. Contact centers, for example, use IVR systems to identify and segment callers. The ability to identify customers enables services to be customized according to a customer profile, and allows the option of choosing automated services. Information can be fed to the caller allowing choices such as, wait in the queue, choose an automated service, or request a callback at a more suitable time and telephone number. Interactive voice response can be used to "front-end" a contact center operation by identifying the needs of the caller. Information can be obtained from the caller, such as account numbers. Answers to simple questions such as account balances or pre-recorded information can be provided without operator intervention.

IVR call flows are created in a variety of ways. A traditional IVR application depended upon proprietary programming or scripting languages, whereas modern IVR applications are structured similar to world wide web ("www") pages, using VoiceXML, SALT or T-XML languages. The ability to use XML-developed applications allows a Web server to act as an application server.

Modern IVR/speech front-end systems for call processing in contact center operations are port based. Each call entering the system is assigned a particular port on an IVR server. The port couples the IVR server to a line of service on the public switched telephone network (PSTN) or on a private branch exchange (PBX). The call stays assigned to that port for as long as it is active in the IVR system. As long as the call is undergoing IVR/speech treatment, it is assigned to a fixed port. Contact center IVR systems are therefore sized by the number of ports that they can allocate during busiest time intervals. The port in an IVR system is therefore a very critical resource. An IVR application is written such that it optimizes the amount of time the call is live in the IVR system (i.e., the port usage of the call).

Call volume within an IVR system is not constant and can vary significantly throughout a workday. Since call volume is not constant, port utilization within the IVR system varies. Incoming calls will receive a "port busy" signal when all ports are assigned to other calls. While port utilization varies based on call volume, the prompts played by the IVR application are constant fixed length prompts and do not react to changes in call volumes. Similarly, the call flow is constant and is fixed at the time of design and implementation of the IVR system. Call flow does not change dynamically in response to changes in call volumes. Therefore, the IVR application, which is written in advance for a specific need, makes the caller go through a predetermined call flow with regard for how busy the system may be. The IVR application is unable to respond to changing call volumes. As a result, costly IVR resources are not efficiently allocated during a period of high call volume.

BRIEF SUMMARY OF THE INVENTION

The present invention provides a method, system and computer-readable medium for adjusting port usage and call duration in an interactive voice response (IVR) system based on changes in call volume. In one embodiment, the method comprises monitoring usage of one or more ports within an IVR system. A determination is made whether the usage of the ports exceeds a predetermined threshold for port usage. In response to determining that port usage exceeds the predetermined threshold, the method automatically adjusts one or more call flows within the IVR system to reduce call duration within the IVR system. Adjusting the call flows may further comprise receiving an alert indicating that the port usage has exceeded the predetermined threshold; detecting a setting for adjusting the flows in response to receiving the alert; and adjusting the call flows according to the detected setting. The call flows may be adjusted by executing call flows having one priority and not executing call flows having a different priority. Alternatively, the call flows may be adjusted by examining port usage relative to the predetermined threshold; determining a priority level of call flows to execute, wherein the determined priority level is based upon the observed port usage relative to the predetermined threshold; executing call flows having a priority level higher than or equal to the determined priority level; and not executing call flows having a priority level lower than the predetermined priority level. Call flows may be adjusted by querying one or more call threads to find call threads having common nodes in their respective call flows, and conferencing together the call threads at their common nodes. Call flows may also be adjusted by determining the cause of an increase in call volume within the IVR system; selecting one or more methods for reducing call duration, wherein the selected methods are configured for reducing the call duration in response to the determined cause of the increase in call volume; and adjusting the call flows in accordance with the selected methods. A dedicated port monitoring server may be used to monitor port usage and coordinate changes in call flows.

The above, as well as additional purposes, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, as well as a best mode of use, further purposes and advantages thereof, will best be understood by reference to the following detailed description of an illustrative embodiment when read in conjunction with the accompanying drawings, where:

DETAILED DESCRIPTION OF THE INVENTION

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

The medium can be an electronic, magnetic, optical, electromagnetic, infrared or semiconductor system, apparatus or device or a propagation medium. Examples of a computer-readable medium include a semiconductor or solid state memory (e.g., flash drive memory), magnetic tape, a removable computer diskette, a random access memory (RAM), a read-only memory (ROM), a rigid magnetic disk (e.g., a hard drive) and an optical disk. Current examples of optical disks include compact disk-read only memory (CD-ROM), compact disk-read/write (CD-R/W) and Digital Versatile Disk (DVD).

Figure 1:
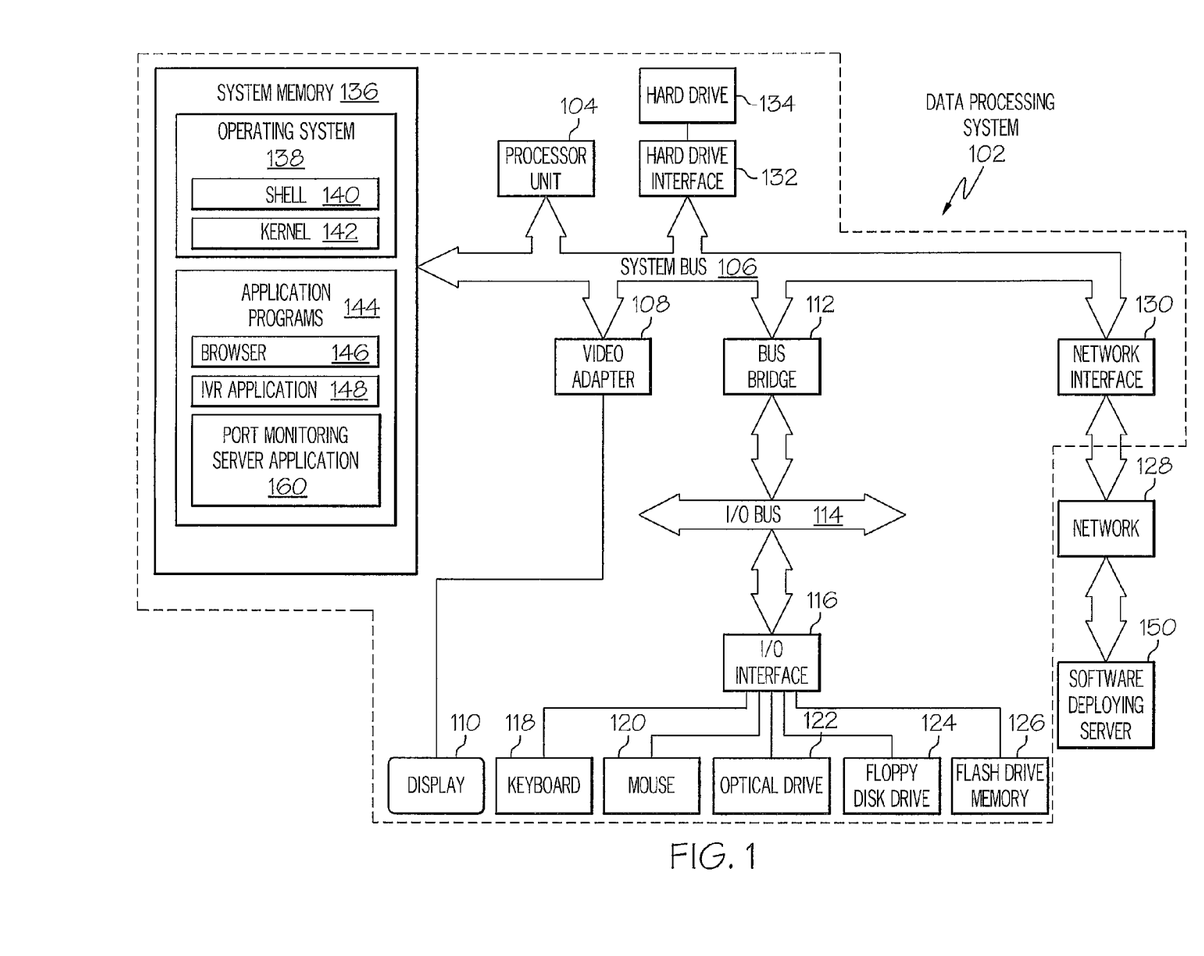
FIG. 1 is a block diagram of an exemplary data processing system in which all or part of the present invention may be implemented.

Referring now to the drawings, wherein like numbers denote like parts throughout the several views, FIG. 1 shows a block diagram of a data processing system suitable for storing and/or executing program code in accordance with one or more embodiments of the present invention. The hardware elements depicted in data processing system 102 are not intended to be exhaustive, but rather are representative of one embodiment of the present invention. Data processing system 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, an optical disk drive 122, a floppy disk drive 124, and a flash drive memory 126. The format of the ports connected to I/O interface 116 may be any known to those skilled in the art of computer architecture, including but not limited to Universal Serial Bus (USB) ports.

Data processing system 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Software deploying server 150 may utilize a similar architecture design as that described for data processing system 102.

A hard drive interface 132 is also coupled to system bus 106. Hard drive interface 132 interfaces with hard drive 134. In an illustrative embodiment, hard drive 134 populates a system memory 136, which is also coupled to system bus 106. Data that populates system memory 136 includes an operating system (OS) 138 of data processing system 102 and application programs 144 (e.g., IVR application 148).

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., data processing system 102) to send and receive network messages to the Internet using HyperText Transfer Protocol (HTTP) messaging, thus enabling communication with software deploying server 150.

Application programs 144 in the system memory of data processing system 102 (as well as the system memory of software deploying server 150) also include IVR application 148 and port monitoring server application 160. IVR application 148 and port monitoring server application 160 comprise computer-executable code, at least a portion of which implements one or more methods described herein. In one embodiment, data processing system 102 is able to download IVR application 148 and/or port monitoring server application 160 from software deploying server 150.

The hardware elements depicted in data processing system 102 are not intended to be exhaustive, but rather are representative to highlight essential components required by the present invention. For instance, data processing system 102 may include alternate memory storage devices such as magnetic cassettes, Digital Versatile Disks (DVDs), Bernoulli cartridges, and the like. These and other variations are intended to be within the spirit and scope of the present invention.

Note further that, in one embodiment of the present invention, software deploying server 150 performs all of the functions associated with the present invention (including execution of IVR application 148 and/or port monitoring server application 160), thus freeing data processing system 102 from having to use its own internal computing resources to execute IVR application 148 and/or port monitoring server application 160.

Figure 2:
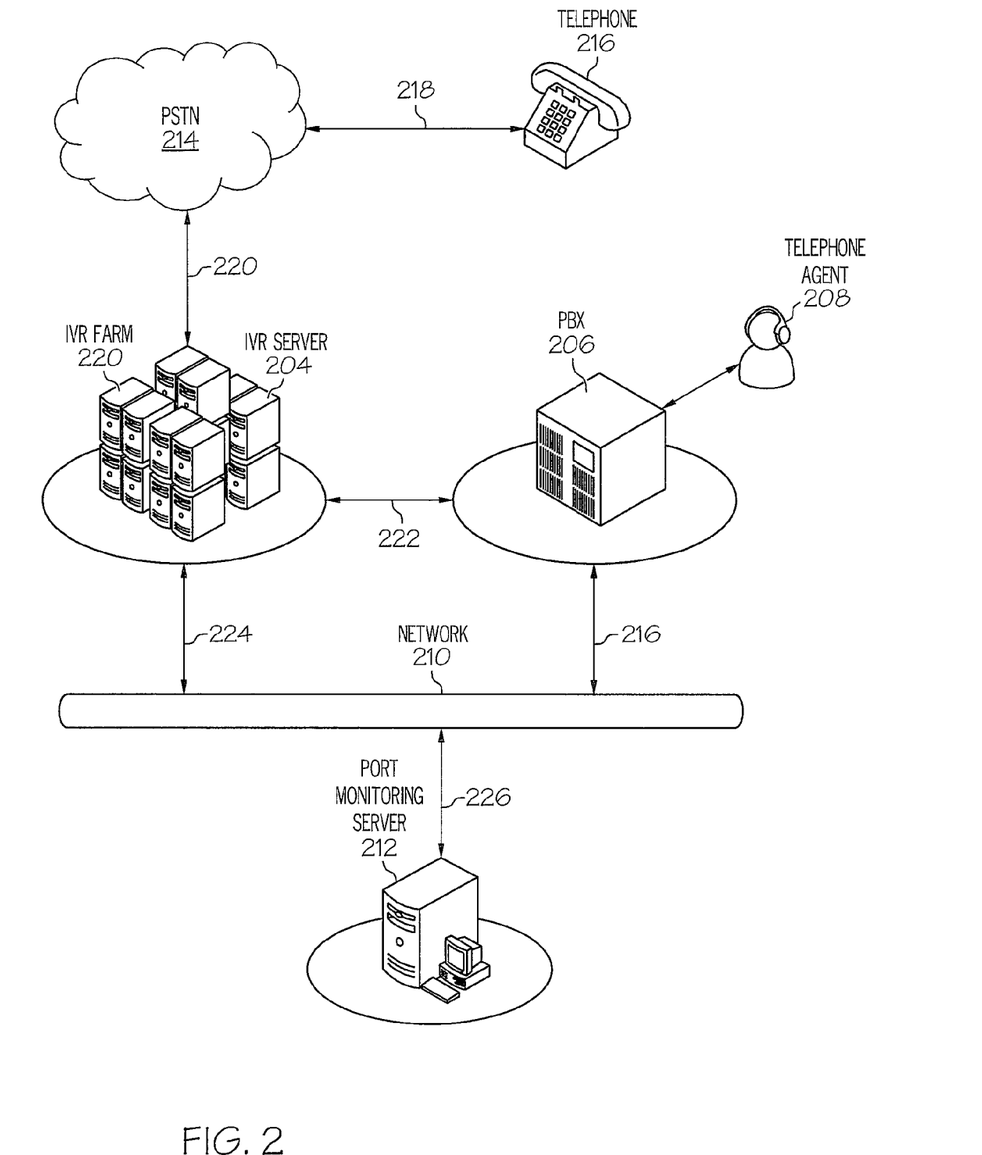
FIG. 2 is a diagram of an improved interactive voice response (IVR) system that is able to make adjustments to call duration and port usage in response to changes in call volume.

With reference now to FIG. 2, a diagram is shown of an improved interactive voice response (IVR) system that is able to make adjustments to call duration and port usage in response to changes in call volume. A caller to a contact center uses a telephone 216 connected by communications link 218 to a public switched telephone network (PSTN 214) to place a call to the contact center. Communications link 218 can be any means of placing a telephone call, including using a land-line or wireless phone. The call is connected to IVR farm 202 by communications link 220. IVR farm 202 includes one or more IVR servers 204, and each IVR server 204 includes one or more ports connected to PSTN 214 via communications link 220. Communications link 220 (e.g., T1 cabling) is capable of handling a number of calls from PSTN 214.

Each call entering IVR farm 202 is assigned a particular port of an IVR server 204 in IVR farm 202. An IVR application directs the flow of the call while in IVR farm 202 by, for example, playing recorded prompts to the caller, receiving touch-tone inputs from the caller, etc. The call stays assigned to that fixed port for as long as long as the call is undergoing IVR/speech treatment. When the call flow within IVR system 200 is complete, the port is released by the IVR application and is available to receive another call from PSTN 214. One way in which call flow within IVR farm 202 is completed occurs when the call is transferred to a private branch exchange (PBX 206). PBX 206 is coupled to IVR farm 202 by communications link 222. PBX 206 connects the call from PSTN 214 to telephone agent 208, who then services the call. IVR farm 202 and PBX 226 are both connected (by network connections 224 and 226) to a local area network or wide area network (network 210) of the organization that operates the contact center. Port monitoring server 212 is also connected to network 210 by network connection 226. Port monitoring server 212 executes port monitoring server application 160. Port monitoring server application 160 monitors the port usage of each IVR server 204 in IVR farm 202.

Figure 3:
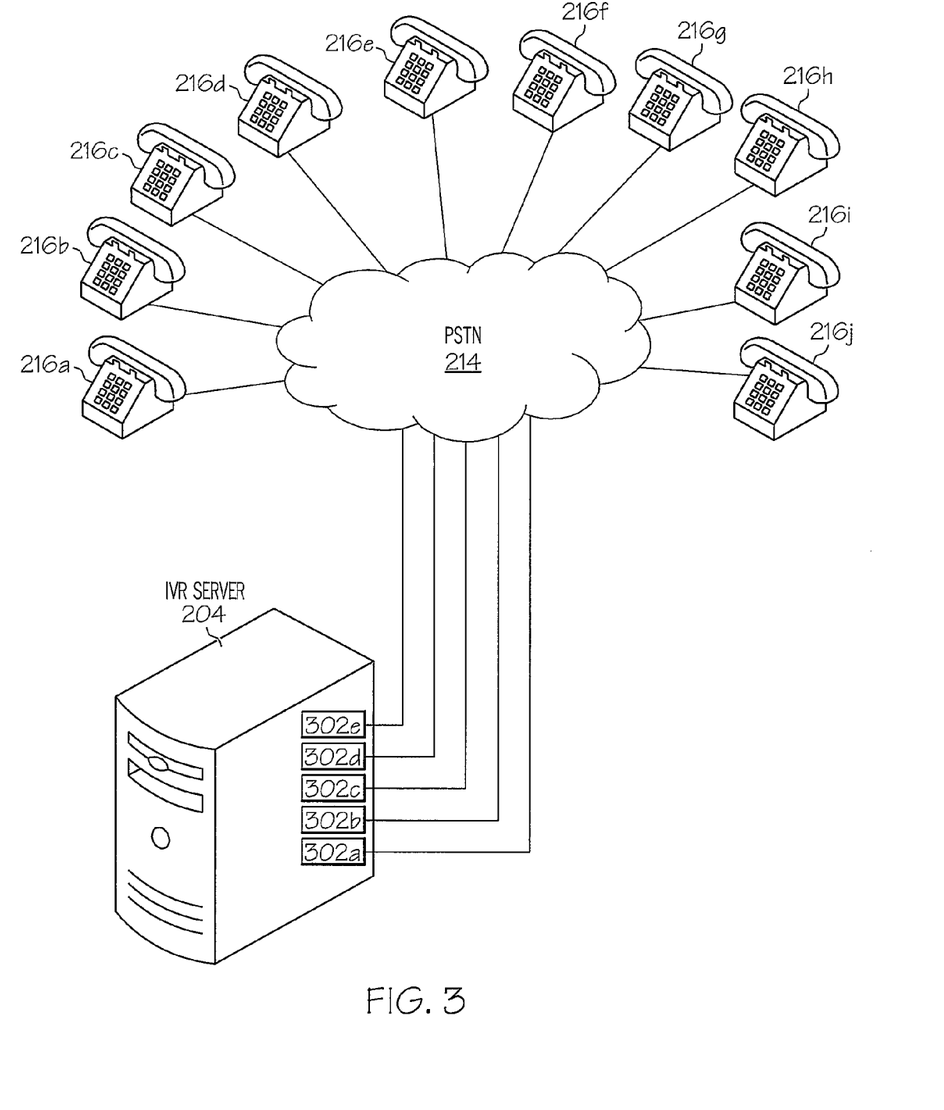
FIG. 3 is a diagram of an IVR server with a fixed number of ports coupled to telephones via the public switched telephone network.

With reference now to FIG. 3, a diagram of an IVR server with a fixed number of ports is shown. Any number of telephones 216a-j coupled to PSTN 214 can place a call to IVR farm 202. Each call entering IVR farm 202 is assigned a particular port on an IVR server, such as IVR server 204. IVR server 204 has a fixed number of ports 302a-e. As long as the number of calls does not exceed the number of ports available in IVR farm 202, callers will not receive a "port busy" indication. During peak call times or in response to a particular event, the number of calls may exceed the number of unused ports available in IVR farm 202. Typical IVR farms are therefore sized by the number of ports that can be allocated during peak call volumes. A port in an IVR farm is therefore a very critical resource.

While ten telephones are shown in FIG. 3 for purposes of illustration, any telephone coupled to PSTN 214 can place a call to IVR farm 220. Also for purposes of illustration, IVR server 204 is shown as having five ports 302a-e, but IVR server 204 is not limited or required to have five ports.

Figure 4:
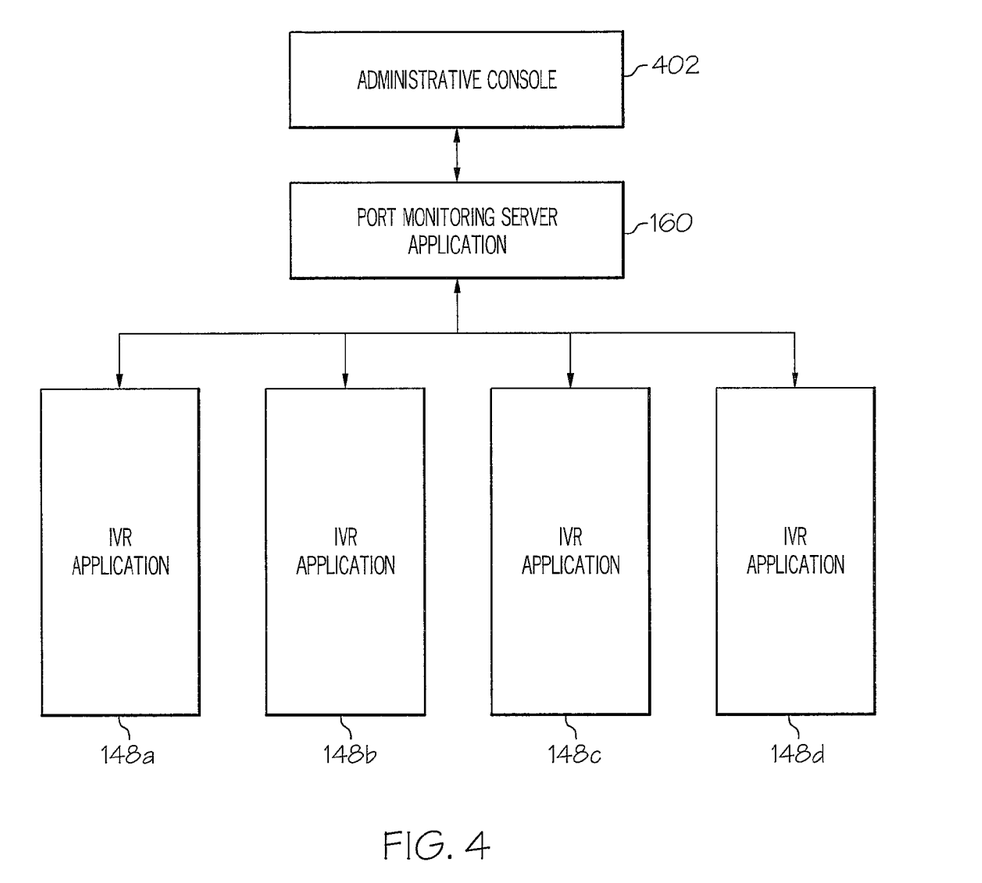
FIG. 4 is a diagram of an improved interactive voice response (IVR) system in accordance with one or more embodiments of the present invention.

With reference now to FIG. 4, a diagram of an improved interactive voice response (IVR) system is shown in accordance with one or more embodiments of the present invention. Port monitoring server 212 executes port monitoring server application 160. Port monitoring server application 160 monitors the port usage of each IVR server 204 in IVR farm 202. When port usage on IVR server 204a exceeds a predetermined threshold, port monitoring server application 160 sends an alert to IVR application 148a executing on IVR server 204a. Port monitoring server application 160 displays administrative console 402 to the system administrator, enabling a system administrator to perform various tasks including setting the port usage thresholds and setting call flow adjustments when the port usage threshold is exceeded. Port monitoring server application 160 may also be configured to send a simple network management protocol (SNMP) alert to a system administrator when a port usage threshold is exceeded.

Figure 5:
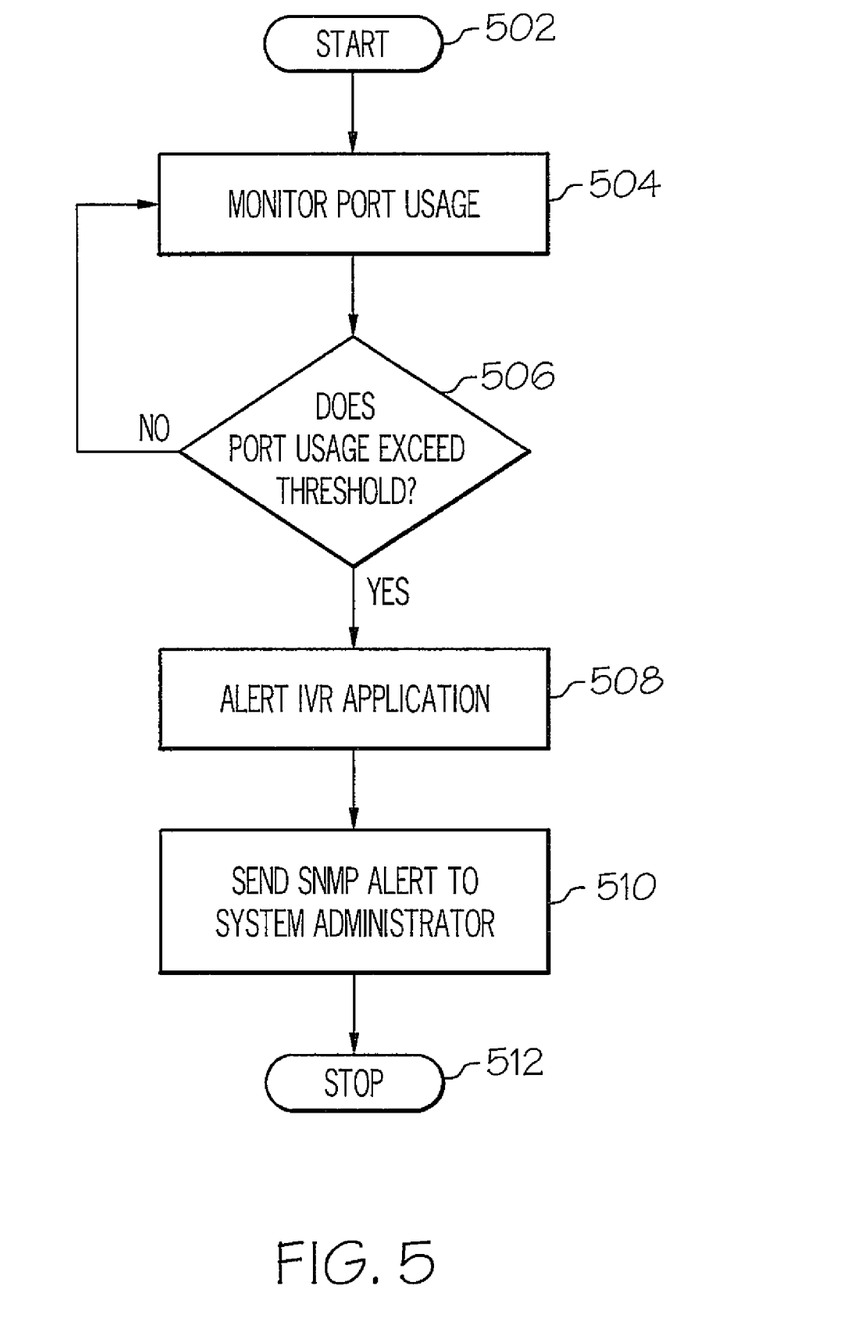
FIG. 5 is a flowchart of an exemplary method for monitoring port usage in an IVR farm.

With reference now to FIG. 5, a flowchart of an exemplary method for monitoring port usage in an IVR farm is shown. The method begins at initiator block 502 and proceeds to step 504, where port monitoring server application 160 detects the port usage of each IVR server 204 in IVR farm 202. If the port usage of the IVR servers does not exceed a predetermined threshold (step 506), the process returns to step 504. If the port usage of an IVR server exceeds a predetermined threshold (step 506), port monitoring server application 160 sends an alert to the IVR application executing on the IVR server having the excessive port usage (step 508). Port monitoring application also sends an alert via SNMP to the system administrator (step 510). The process ends at terminator block 512.

Figure 6:
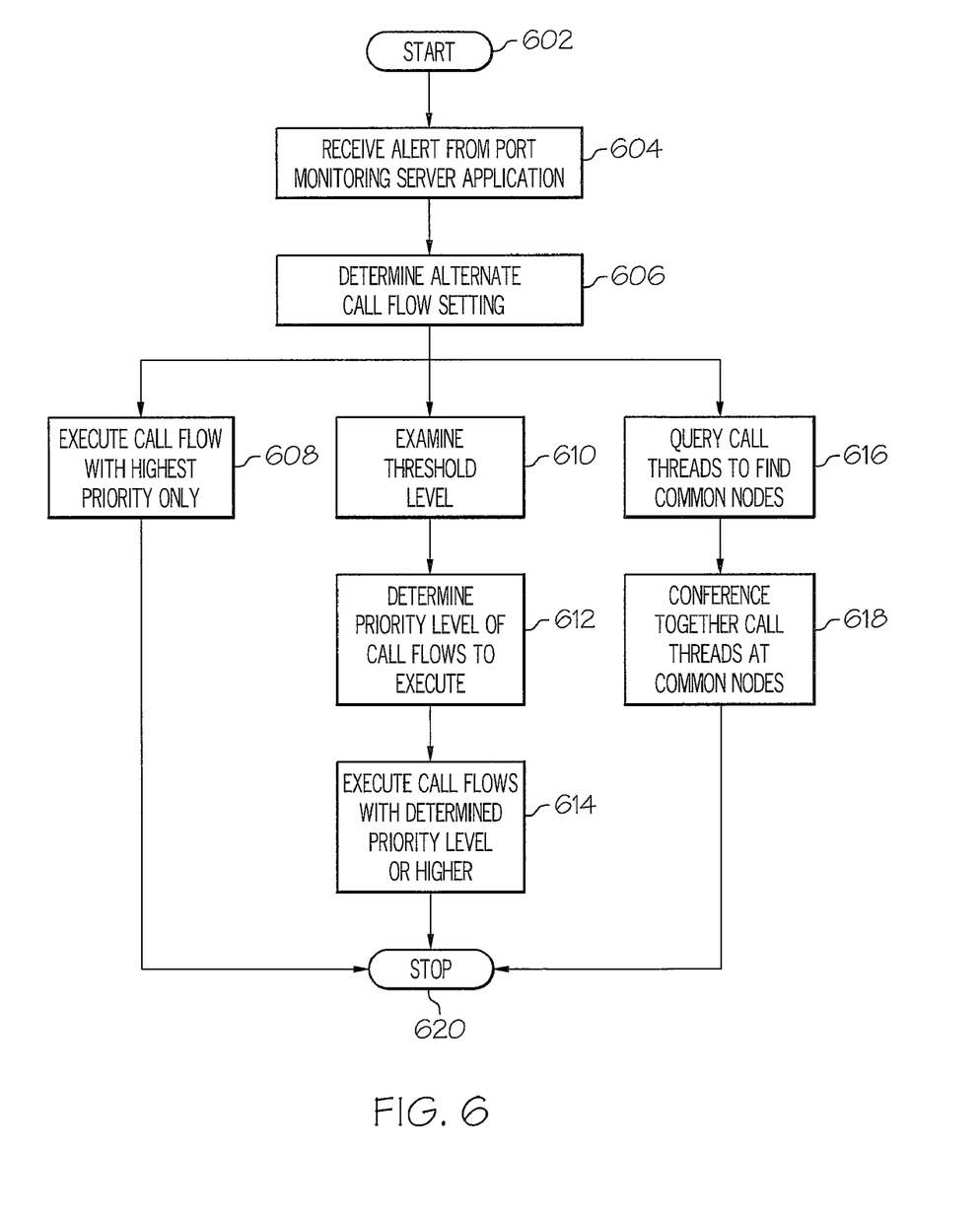
FIG. 6 is a flowchart of an exemplary method for adjusting call flow in response to port usage exceeding a predetermined threshold.

With reference now to FIG. 6, a flowchart is shown of an exemplary method for automatically adjusting call flow in response to port usage exceeding a predetermined threshold. The method begins at initiator block 602. IVR application 148, executing on IVR server 204 of IVR farm 202, receives an alert from port monitoring server application 160 (step 604). In response to receiving the alert, IVR application 148 determines an alternate call flow setting (step 606) assigned by port monitoring server application 160. IVR application 148 can be designed to adjust call flow in any number of different ways. For example, according to one embodiment, IVR application 148 designates call flow based on priorities. Every entry point node is assigned a priority within the entire call flow. The priorities can be as simple as high, medium or low, or a more complex hierarchical scheme. On receiving a port threshold alert, IVR application 148 is configured to execute the call flow with an entry point node having the highest priority only (step 608). For example, this may be a node in the call flow where a call is transferred to a highly skilled telephone agent, thereby taking the call off of the port within the IVR server.

Alternatively, IVR application 148 may be configured to examine port usage relative to the threshold level (step 610) and determine a priority level of call flows to execute (step 612). IVR application 148 subsequently executes call flows having the determined priority level or higher (step 614). For example, if port usage slightly exceeds the threshold level, then lower priority levels of call flows may be executed. If port usage greatly exceeds the threshold level, then the execution of call flows may be restricted to higher priority levels only.

IVR application 148 may also be configured to query call threads to find threads that are at a common node in the call flow (step 616) and conference more than one call into a single thread, thereby taking calls off IVR ports earlier in the call flow (step 618). For example, IVR application 148 plays the same prerecorded second announcement to each caller prior to a call leaving the IVR system. The announcement informs the caller of new support options available online and lasts for a duration of 45 seconds. Instead of playing the same announcement to five different call threads individually, IVR application 148 conferences the calls threads together into one thread for the 45 second announcement. By conferencing the calls in this manner, call duration on four of the five ports is reduced by 45 seconds.

Port monitoring server 212 is not limited to only monitoring port utilization. Call duration of the IVR ports can be adjusted depending upon the cause of the call volume increase (e.g., a major system problem due to natural causes or human error). Call flow priorities need not be static, and assignments can be changed dynamically depending upon the cause of the volume increase. An IVR function that was low priority during normal call volumes before the system problem can dynamically be changed to high priority in response to the specific system problem causing the increased call volumes.

While the present invention has been particularly shown and described with reference to an illustrative embodiment, it will be understood by those skilled in the art that various changes in form and detail may be made therein without departing from the spirit and scope of the invention. Furthermore, as used in the specification and the appended claims, the term "computer" or "computer system" or "computing device" includes any data processing system including, but not limited to, personal computers, servers, workstations, network computers, mainframe computers, routers, switches, Personal Digital Assistants (PDA's), telephones, and any other system capable of processing, transmitting, receiving, capturing and/or storing data. The term "system" or "information system" includes a network of data processing systems.

The flowchart and diagrams in the Figures illustrate the architecture, functionality, and operation of possible implementations of systems, methods and computer program products according to various embodiments of the present invention. In this regard, each block in the flowchart or diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to illustrative embodiments thereof, it will be apparent that modifications and variations are possible without departing from the scope of the invention defined in the appended claims.

What is claimed is:

1. A method comprising:
    monitoring a usage of one or more ports within an interactive voice response system;
    determining whether the usage of said one or more ports exceeds a predetermined threshold for port usage;
    in response to a determination that the usage of said one or more ports exceeds the predetermined threshold, automatically adjusting one or more call flows within the interactive voice response system to reduce a call duration for the interactive voice response system;
    querying one or more call threads to find call threads having common nodes in their respective call flows; and
    conferencing together said call threads at said common nodes.

2. The method of claim 1, wherein said adjusting one or more call flows further comprises:
    receiving an alert indicating that the usage of said one or more ports has exceeded the predetermined threshold;
    detecting a setting for adjusting the one or more call flows in response to receiving said alert; and
    adjusting the one or more call flows according to the detected setting.

3. The method of claim 1, wherein the one or more call flows are adjusted by executing call flows having a first priority and not executing call flows having a second priority.

4. The method of claim 1, wherein said one or more call flows are adjusted by:
    examining the usage of said one or more ports relative to the predetermined threshold;
    determining a priority level of call flows to execute, wherein the determined priority level is based upon the usage of said one or more ports relative to the predetermined threshold;
    executing call flows having a priority level higher than or equal to the determined priority level; and
    not executing call flows having a priority level lower than the predetermined priority level.

5. The method of claim 1, wherein said adjusting one or more call flows further comprises:
    determining a cause of an increase in call volume within the interactive voice response system;
    selecting one or more methods from a plurality of methods for reducing call duration, wherein the selected one or more methods are configured for reducing the call duration in response to the determined cause of the increase in call volume; and
    adjusting said one or more call flows in accordance with the selected one or more methods.

6. The method of claim 1, wherein said monitoring and determining are performed by a port monitoring server.

7. A system comprising:
    one or more interactive voice response servers having a plurality of ports coupled to a telecommunications network;
    at least one port monitoring server coupled to said plurality of interactive voice response servers;
    means for monitoring a usage of one or more ports within an interactive voice response system;
    means for determining whether the usage of said one or more ports exceeds a predetermined threshold for port usage;
    means, responsive to a determination that the usage of said one or more ports exceeds the predetermined threshold, for automatically adjusting one or more call flows within the interactive voice response system to reduce a call duration for the interactive voice response system;

means for querying one or more call threads to find call threads having common nodes in their respective call flows; and means for conferencing together call threads at said common nodes.

8. The system of claim 7, wherein said means for adjusting one or more call flows further comprises:

means for receiving an alert indicating that the usage of said one or more ports has exceeded the predetermined threshold; means for detecting a setting for adjusting the one or more call flows in response to receiving said alert; and means for adjusting the one or more call flows according to the detected setting.

9. The system of claim 7, wherein the means for adjusting the one or more call flows executes call flows having a first priority and does not execute call flows having a second priority.

10. The system of claim 7, wherein the means for adjusting said one or more call flows further comprises:

means for examining the usage of said one or more ports relative to the predetermined threshold;

means for determining a priority level of call flows to execute, wherein the determined priority level is based upon the usage of said one or more ports relative to the predetermined threshold; and means for executing call flows having a priority level higher than or equal to the determined priority level, wherein said means does not execute call flows having a priority level lower than the predetermined priority level.

11. The system of claim 7, wherein the means for adjusting one or more call flows further comprises:

means for determining a cause of an increase in call volume within the interactive voice response system;

means for selecting one or more methods from a plurality of methods for reducing call duration, wherein the selected one or more methods are configured for reducing the call duration in response to the determined cause of the increase in call volume; and means for adjusting said one or more call flows in accordance with the selected one or more methods.

12. A computer-readable non-transitory medium comprising:

program code for monitoring a usage of one or more ports within an interactive voice response system;

program code for determining whether the usage of said one or more ports exceeds a predetermined threshold for port usage; and program code for, in response to a determination that the usage exceeds the predetermined threshold, automatically adjusting one or more call flows within the interactive voice response system to reduce a call duration for the interactive voice response system;

program code for querying one or more call threads to find call threads having common nodes in their respective call flows; and program code for conferencing together call threads at said common nodes.

13. The computer-readable non-transitory medium of claim 12, wherein said program code for adjusting one or more call flows further comprises program code for receiving an alert indicating that the usage of said one or more ports has exceeded the predetermined threshold;

program code for detecting a setting for adjusting the one or more call flows in response to receiving said alert; and program code for adjusting the one or more call flows according to the detected setting.

14. The computer-readable non-transitory medium of claim 12, wherein the one or more call flows are adjusted by executing call flows having a first priority and not executing call flows having a second priority.

15. The computer-readable non-transitory medium of claim 12, wherein said one or more call flows are adjusted by:

examining the usage of said one or more ports relative to the predetermined threshold;

determining a priority level of call flows to execute, wherein the determined priority level is based upon the usage of said one or more ports relative to the predetermined threshold;

executing call flows having a priority level higher than or equal to the determined priority level; and not executing call flows having a priority level lower than the predetermined priority level.

16. The computer-readable non-transitory medium of claim 12, wherein said program code for adjusting one or more call flows further comprises:

program code for determining a cause of an increase in call volume within the interactive voice response system;

program code for selecting one or more methods from a plurality of methods for reducing call duration, wherein the selected one or more methods are configured for reducing the call duration in response to the determined cause of the increase in call volume; and program code for adjusting said one or more call flows in accordance with the selected one or more methods.

17. The computer-readable non-transitory medium of claim 12, wherein the monitoring and determining steps are performed by a port monitoring server.

* * * * *